United States Patent
Kinoshita

(10) Patent No.: US 9,803,693 B2
(45) Date of Patent: Oct. 31, 2017

(54) SHAFT SUPPORTING UNIT AND MANUFACTURING METHOD THEREOF

(71) Applicant: YOURBUSINESS CO., LTD., Tokyo (JP)

(72) Inventor: Tadatoshi Kinoshita, Tokyo (JP)

(73) Assignee: YOURBUSINESS CO., LTD., Tokyo (JP)

( * ) Notice: Subject to any disclaimer, the term of this patent is extended or adjusted under 35 U.S.C. 154(b) by 0 days.

(21) Appl. No.: 15/085,320

(22) Filed: Mar. 30, 2016

(65) Prior Publication Data

US 2016/0290402 A1    Oct. 6, 2016

(30) Foreign Application Priority Data

Mar. 30, 2015    (JP) ................................ 2015-068616

(51) Int. Cl.
| | |
|---|---|
| *F16C 35/02* | (2006.01) |
| *F16C 11/04* | (2006.01) |
| *F16C 17/02* | (2006.01) |
| *F16C 13/04* | (2006.01) |

(52) U.S. Cl.
CPC .............. *F16C 35/02* (2013.01); *F16C 11/04* (2013.01); *F16C 17/02* (2013.01); *F16C 17/022* (2013.01); *F16C 13/04* (2013.01); *F16C 2300/02* (2013.01); *F16C 2322/14* (2013.01)

(58) Field of Classification Search
CPC  F16C 35/02; F16C 11/04; F16C 17/02; F16C 17/022
See application file for complete search history.

(56) References Cited

U.S. PATENT DOCUMENTS

| | | | | |
|---|---|---|---|---|
| 175,647 | A * | 4/1876 | Bignall | F16C 35/02 384/434 |
| 1,863,142 | A * | 6/1932 | Sisson | B61G 7/10 384/434 |
| 2,823,961 | A * | 2/1958 | Showalter | B65H 16/06 242/598.4 |

(Continued)

FOREIGN PATENT DOCUMENTS

| | | |
|---|---|---|
| CA | 1038433 | 9/1978 |
| JP | 2002-206553 | 7/2002 |

(Continued)

OTHER PUBLICATIONS

Extended European Search Report dated Sep. 2, 2016 in corresponding European Application No. 16162588.4.

(Continued)

*Primary Examiner* — Thomas R. Hannon
(74) *Attorney, Agent, or Firm* — Wenderoth, Lind & Ponack, L.L.P.

(57) ABSTRACT

A shaft supporting unit 15A supports a shaft of a pivoting body with capacity of pivot movement. A lower block 58A has a lower recess with a semicircular column shape, and is configured to support the shaft from beneath. A lower bush 59 has a semi-cylindrical shape, is located in the lower recess, and is configured to slide the shaft on it. The shaft supporting unit 15A does not abut an upper side of the shaft when the pivoting body pivots. An upper block 56A is configured to cover above the shaft, and has an upper recess with a predetermined gap between it and the shaft.

6 Claims, 9 Drawing Sheets

(56) References Cited

U.S. PATENT DOCUMENTS

| | | | | |
|---|---|---|---|---|
| 4,560,290 A | * | 12/1985 | Siebert | F16C 13/02 |
| | | | | 384/191.3 |
| 4,647,229 A | * | 3/1987 | Melugin | F16C 13/04 |
| | | | | 384/434 |
| 5,709,482 A | | 1/1998 | Lutz | |
| 7,363,794 B2 | * | 4/2008 | Kinoshita | B21D 7/028 |
| | | | | 384/276 |
| 2002/0073546 A1 | | 6/2002 | Thompson | |
| 2007/0240483 A1 | | 10/2007 | Kinoshita | |
| 2011/0091597 A1 | | 4/2011 | Kinoshita | |

FOREIGN PATENT DOCUMENTS

| | | |
|---|---|---|
| JP | 2007-283352 | 11/2007 |
| JP | 4597254 | 12/2010 |

OTHER PUBLICATIONS

Notice of Reasons for Refusal dated Apr. 26, 2016 in corresponding Japanese Patent Application No. 2015-068616, with English translation.

* cited by examiner

SHAFT SUPPORTING UNIT AND MANUFACTURING METHOD THEREOF

Priority is claimed on Japanese Patent Application No. 2015-068616, filed on Mar. 30, 2015, the content of which is incorporated herein by reference.

TECHNICAL FIELD

The present invention is related to a shaft supporting unit configured to support a shaft of a pivoting body, and used in an industrial equipment, such as a forming apparatus, a machining apparatus, and a driving transmission apparatus, and other apparatuses.

BACKGROUND ART

An apparatus 10Z shown in FIG. 1 is a press forming apparatus configured to press-forming a body of an automobile. The apparatus 10Z includes the followings.
  A base 11.
  A fixed die 12. It is fixed to the base 11.
  A pivoting body 14. It is configured to pivot around a shaft 41 parallel to an L-R direction, shown in FIG. 2.
  A cylinder 13. It is configured to move a piston 31 toward an F-B direction. This produces pivot movement of the pivoting body 14, via transmission block 42.
  A movable die, not shown. It is configured to move toward a U-D direction, and to press a workpiece 20 placed on the fixed die 12. The workpiece 20 is sandwiched and processed between the movable die and the fixed die 12 and a forming portion 43 of the pivoting body 14.

Pivot movement of the pivoting body 14 enables to process the workpiece 20 into a shape having negative angles. This reduces the number of steps to produce bodies of automobiles, such as front fenders or hood outer panels, or other products having complex shapes.

An apparatus produced and sold as "Swing Die™" by Yourbusiness Co., Ltd. of Tokyo, Japan is known as the above described press forming apparatus.

As shown in FIGS. 2 and 3, the apparatus 10Z includes bearing units 15Y and 15Z. The bearing units 15Y and 15Z are configured to support the shaft 41 of the pivoting body 14 with capacity of pivot movement. The bearing unit 15Z has an upper block 56Z and a lower block 58Z. The bearing unit 15Y has a mirror image shape of the bearing unit 15Z, and has an upper block 56Y and a lower block 58Y.

The lower blocks 58Y and 58Z are fixed to the base 11 by using fixing members such as bolts. When the apparatus 10Z is assembled, the shaft 41 of the pivoting body 14 is mounted on the lower blocks 58Y and 58Z. Then, the upper blocks 56Y and 56Z are mounted on the lower blocks 58Y and 58Z on which the shaft 41 is mounted, and fixed by using fixing members such as bolts.

The pivoting body 14 is very heavy, and pulled up with a crane or the like to move it. This makes it extremely difficult to insert the shaft 41 into a shaft hole portion of the bearing unit from the side. Dividing of the bearing units 15Y and 15Z into upper and lower parts makes it easy to assemble the apparatus 10Z.

As shown in FIG. 4, a recess 61Z, or upper recess, with a semicircular column shape, shown in FIG. 8, is provided on a lower face, or a D side face, of the upper block 56Z. An upper bush 57 is fixed in it. A recess 81, or lower recess, with a semicircular column shape, shown in FIGS. 11 and 12, is provided on a upper face, or a U side face, of the lower block 58Z. A lower bush 59 is fixed in it. In this manner, the shaft hole portion of the bearing unit 15Z is formed by combining the recess 61Z of the upper block 56Z and the recess 81 of the lower block 58Z.

As shown in FIGS. 5 and 6, the upper bush 57 has a semi-cylindrical shape, is made of cast iron or the like, and has a countersink 71. The countersink 71 penetrates the upper bush 57 near the center of it. A flat head bolt 51a, shown in FIG. 14, is inserted through it. The flat head bolt 51a fixes the upper bush 57 to the upper block 56Z.

As shown in FIGS. 7 and 8, the upper block 56Z is made of steel or the like, and includes the followings.
  A female screw hole 66. It is bored near the center of the recess 61Z toward a U direction. It engages with the flat head bolt 51a to fix the upper bush 57 to the upper block 56Z.
  Positioning holes 64a and 64b. They penetrate the upper block 56Z in the U-D direction. Knock pins 55a and 55b, shown in FIG. 13, are fitted through them. The knock pins 55a and 55b fix the positional relation between the upper block 56Z and the lower block 58Z.
  Bolt holes 62a to 62c. They penetrate the upper block 56Z in the U-D direction. Bolts 53a to 53c, shown in FIG. 13, are inserted through them. The bolts 53a to 53c fix the upper block 56Z to the lower block 58Z.

As shown in FIGS. 9 and 10, the lower bush 59 is also called as a sliding bearing, or an oilless bush. It has a semi-cylindrical shape, is made of bronze or the like, and includes a countersink 91. The countersink 91 penetrates the lower bush 59 near the center of it. A flat head bolt 51b, shown in FIG. 14, is inserted through it. The flat head bolt 51b fixes the lower bush 59 to the lower block 58Z.

As shown in FIGS. 11 and 12, the lower block 58Z is made of steel or the like, and includes the followings.
  A female screw hole 86. It is bored near the center of the recess 81 toward a D direction. It engages with the flat head bolt 51b to fix the lower bush 59 to the lower block 58Z.
  Positioning holes 85a and 85b. They are bored from the upper face of the lower block 58Z toward the D direction. The knock pins 55a and 55b are fitted into them to position the upper block 56Z referring to the lower block 58Z.
  Female screw holes 83a to 83c. They are bored from the upper face of the lower block 58Z toward the D direction. They engage with the bolts 53a to 53c to fix the upper block 56Z to the lower block 58Z.
  Positioning holes 84a and 84b. They penetrate the lower block 58Z in the U-D direction. Knock pins 54a, shown in FIG. 14, and 54b, not shown, are fitted through them. The knock pins 54a and 54b are fitted into positioning holes provided on the base 11 to position the lower block 58Z referring to the base 11.
  Bolt holes 82a to 82c. They penetrate the lower block 58Z in the U-D direction. Bolts 52a to 52c, shown in FIG. 14, are inserted through them. The bolts 52a to 52c screw into and engage with female screw holes provided on the base 11 to fix the lower block 58Z to the base 11.

As shown in FIGS. 13 and 14, the knock pins 54a and 54b position the lower block 58Z referring to the base 11, and the bolts 52a to 52c fix the lower block 58Z to the base 11. This enables to position the recess 81 referring to the base 11 with extreme accuracy.

Also, the knock pins 55a and 55b position the upper block 56Z referring to the lower block 58Z, and the bolts 53a to 53c fix the upper block 56Z to the lower block 58Z. This enables to position the recess 61Z referring to the recess 81 with extreme accuracy.

At the time of pivot movement, the shaft 41 of the pivoting body 14 slides with the upper bush 57 and the lower bush 59 located in the recesses 61Z and 81. Thus, the shaft hole portion formed by the recesses 61Z and 81 is required to have a perfect circular column shape with extreme accuracy. To realize the required accuracy, the bearing unit 15Z is produced, e.g., by the following procedure.

First, a block 26Z, shown in FIG. 15, with a rectangular parallelepiped shape, and a block 28Z, shown in FIG. 15, with a rectangular parallelepiped shape are provided. The upper block 56Z is formed by processing the block 26Z. The lower block 58Z is formed by processing the block 28Z.

Next, the two blocks 26Z and 28Z are processed to form the bolt holes 62a to 62c and 82a to 82c, the female screw holes 83a to 83c, and the positioning holes 64a, 64b, 84a, 84b, 85a and 85b.

Then, as shown in FIG. 15, the block 26Z is mounted on the block 28Z. The knock pins 55a and 55b fix the positional relation between the blocks 26Z and 28Z. The bolts 53a to 53c fix the block 26Z to the block 28Z. In this manner, the two blocks 26Z and 28Z are unified in the same way as the bearing unit 15Z when in use, to form a workpiece block.

And, the unified workpiece block is processed to form a penetrating hole with a perfect circular column shape with extreme accuracy, so as to form the recesses 61Z and 81.

When in use, the recesses 61Z and 81, formed in this manner, are positioned and combined with high accuracy. This enables to reproduce the penetrating hole as the shaft hole portion having a perfect circular column shape with extreme accuracy.

It should be noted that the combination of the upper block 56Z and the lower block 58Z formed in this manner can not be changed. That is, combining a particular lower block 58Z with an upper block 56Z other than the particular one unified and processed with the particular lower block 58Z fails to make the shaft hole portion to have a perfect circular column shape with extreme accuracy.

Accordingly, signs are given to the upper block 56Z and the lower block 58Z. For example, matchmarks are stamped. The signs show that the two blocks have been unified and processed. This enables to correctly combine the upper block 56Z and the lower block 58Z.

JP 2007-283352 A discloses a similar bearing structure.

SUMMARY OF INVENTION

Technical Problem

Conventional bearing unit 15Z has a lot of parts, and requires much labor to manufacture and to assemble.

The matchmarks are used only for confirmation of correct combination between the upper block 56Z and the lower block 58Z when assembled. In the case that there are a large number of the upper blocks 56Z and the lower blocks 58Z, enormous labor is needed to find correct combination relying on the matchmarks once it has been lost. Thus, strict management is required to prevent loss of the correct combination when stocked.

Also, there is a risk to drop the upper bush 57 caused by looseness of the flat head bolt 51a.

The present invention aims to reduce the number of parts, and labor of manufacture, management and assembly of a unit for supporting a shaft.

Solution to Problem

A shaft supporting unit according to the present invention is for supporting a shaft of a pivoting body with capacity of pivot movement. The shaft supporting unit includes: a lower block having a lower recess with a semicircular column shape, and configured to support the shaft from beneath; and a lower bush having a semi-cylindrical shape, located in the lower recess, and configured to slide the shaft thereon. The shaft supporting unit does not abut an upper side of the shaft when the pivoting body pivots.

The shaft supporting unit may further include an upper block covering above the shaft, and having an upper recess with a predetermined gap between the upper recess and the shaft.

No bush for sliding the shaft thereon is located in the upper recess.

An apparatus according to the present invention includes: the shaft supporting unit; and a pivoting body configured to pivot around a shaft supported by the shaft supporting unit.

A method according to the present invention is for manufacturing two shaft supporting units.

The method includes: making an upper face of a first block to contact with an upper face of a second block, and fixing the first block to the second block to form a workpiece block; forming a penetrating hole with a circular column shape to the workpiece block, so as to form the lower recess to each of the first and second blocks; and using the first block as the lower block of a first shaft supporting unit, and using the second block as the lower block of a second shaft supporting unit, so as to manufacture the first and second shaft supporting units.

A second penetrating hole may be formed to each of the first and second blocks, each of the second penetrating holes configured to insert a fixing member through so as to fix the lower block when in use; and the first and second blocks are fixed by inserting a fixing member through the second penetrating holes.

Another method according to the present invention is for manufacturing two shaft supporting units. The method includes: making a lower face of a first block contact with a lower face of a second block, and fixing the first block to the second block to form a workpiece block; forming a penetrating hole with a column shape to the workpiece block, so as to form the upper recess to each of the first and second blocks; and using the first block as the upper block of a first shaft supporting unit, and using the second block as the upper block of a second shaft supporting unit, so as to manufacture the first and second shaft supporting units.

A second penetrating hole may be formed to each of the first and second blocks, each of the second penetrating holes configured to insert a fixing member through so as to fix the upper block to the lower block when in use; and the first and second blocks are fixed by inserting a fixing member through the second penetrating holes.

Advantageous Effects of Invention

The shaft supporting unit and the apparatus according to the present invention eliminate requirement that the shaft hole portion, formed by combining the upper block and the lower block, has an accurate circular column shape, since the shaft supporting unit does not abut the upper side of the shaft when the pivoting body pivots. Accurate positioning between the upper block and the lower block is not needed. This enables to reduce labor to manufacture and to assemble the shaft supporting unit. Combination of the upper block and the lower block can be changed. This makes it unnecessary to give signs such as matchmarks. This decreases labor of stock management. The upper bush is not required. This removes the risk to drop the upper bush. The female screw hole to fix the upper bush to the upper block is not needed. This enables to make the upper block compact.

The lower block can solely and sufficiently support the shaft, in the case that the lower block is provided with a lower recess having a semicircular column shape. The upper recess may have any column shapes, such as a semicircular column shape, an elliptic column shape or other shapes with a curved surface, or a prism shape or other shapes formed by combining a plurality of plane or curved surfaces. Processing accuracy of the upper recess may be low. This enables to reduce processing cost.

The method according to the present invention makes it efficient to manufacture the shaft supporting unit, since the lower recess is formed to each of the two blocks by one process. Fixing the two blocks by using penetrating holes to fix the lower block makes it more efficient to manufacture the shaft supporting unit.

The method according to the present invention makes it efficient to manufacture the shaft supporting unit, since the upper recess is formed to each of the two blocks by one process.

Fixing the two blocks by using penetrating holes to fix the upper block to the lower block makes it more efficient to manufacture the shaft supporting unit.

DESCRIPTION OF EMBODIMENTS

Embodiment 1: Shaft Supporting Unit and Apparatus Having It

Figure 1:
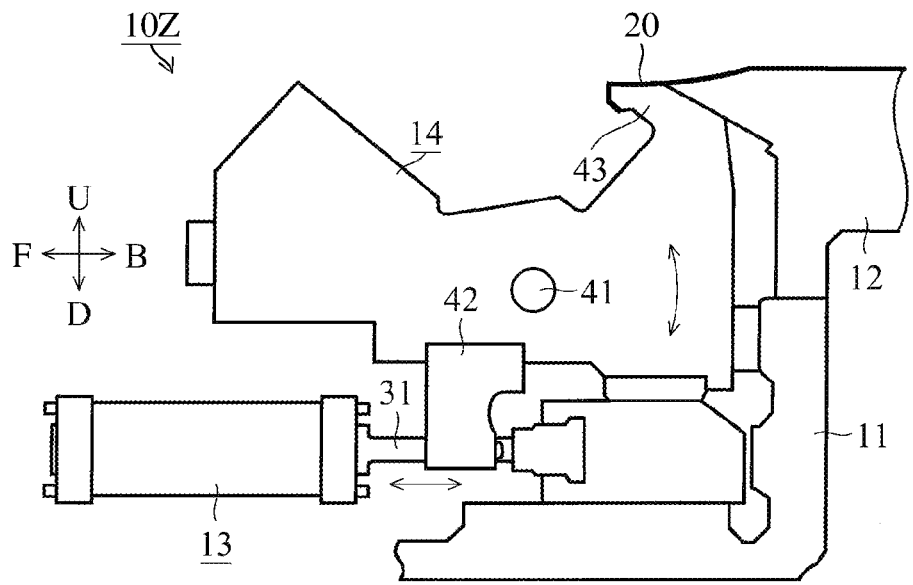
FIGS. 1 and 2 show a side view and a perspective view of an apparatus 10Z respectively.
Figure 2:
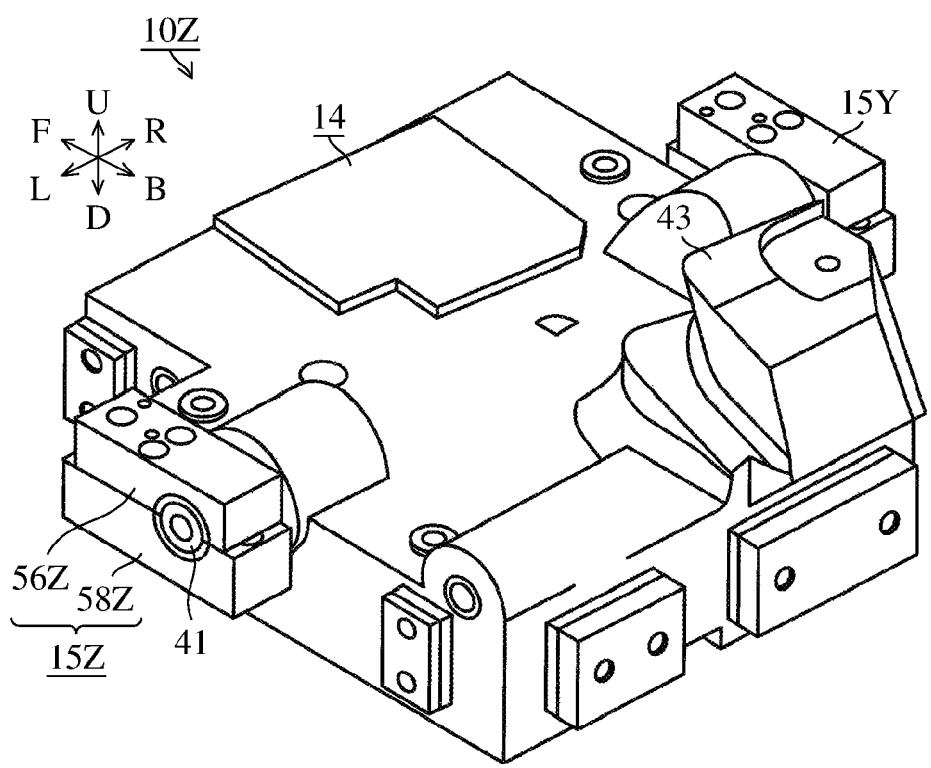
Figure 3:
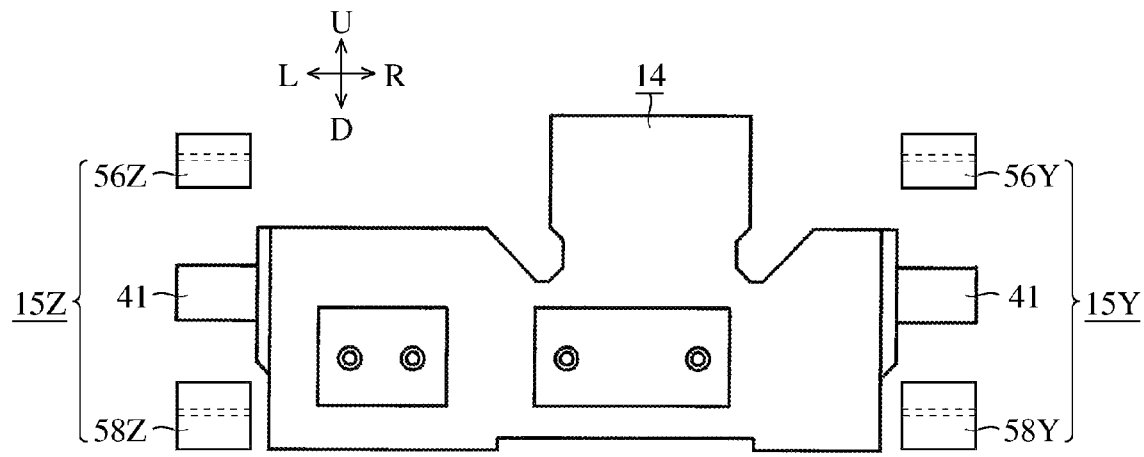
FIG. 3 shows a back view of bearing units 15Y and 15Z.
Figure 4:
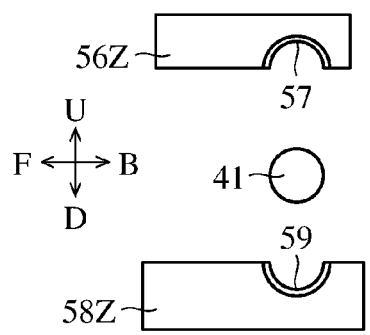
FIG. 4 shows a side view of the bearing unit 15Z.
Figure 5:
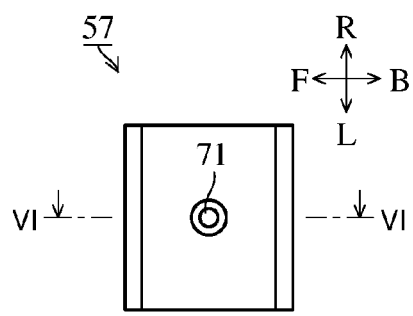
FIGS. 5 and 6 show a bottom view and a VI-VI section view of an upper bush 57 respectively.
Figure 6:
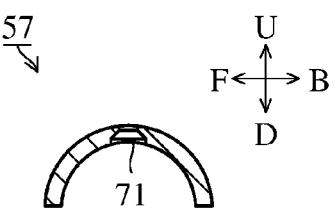
Figure 7:
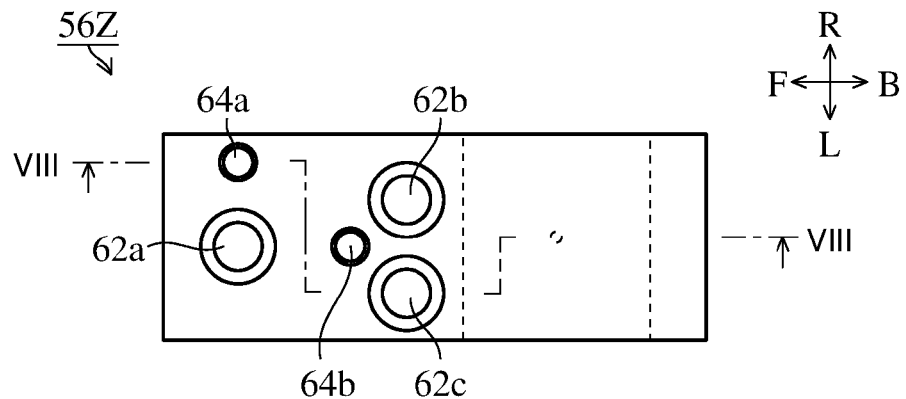
FIGS. 7 and 8 show a plan view and a VIII-VIII section view of an upper block 56Z respectively.
Figure 8:
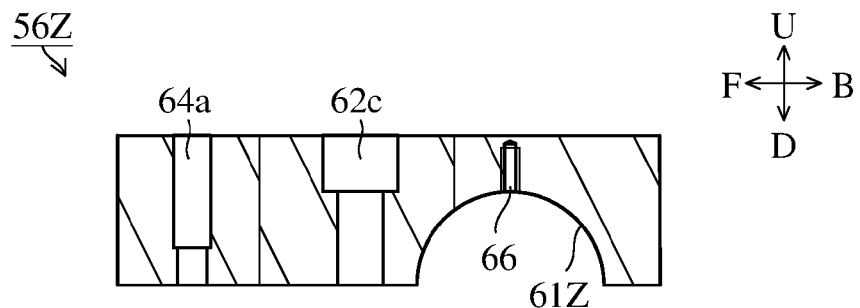
Figure 9:
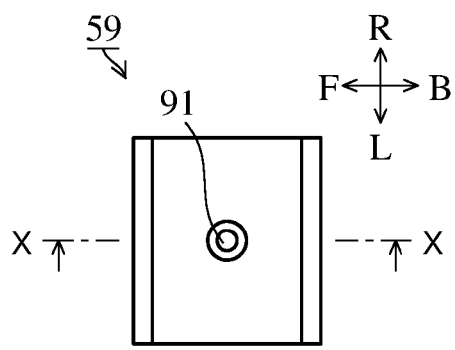
FIGS. 9 and 10 show a plan view and a X-X section view of a lower bush 59 respectively.
Figure 10:
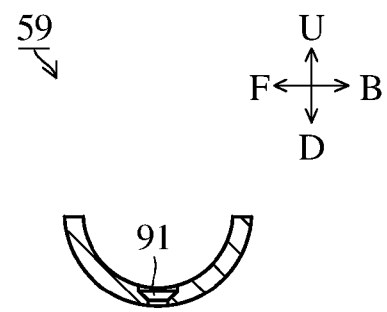
Figure 11:
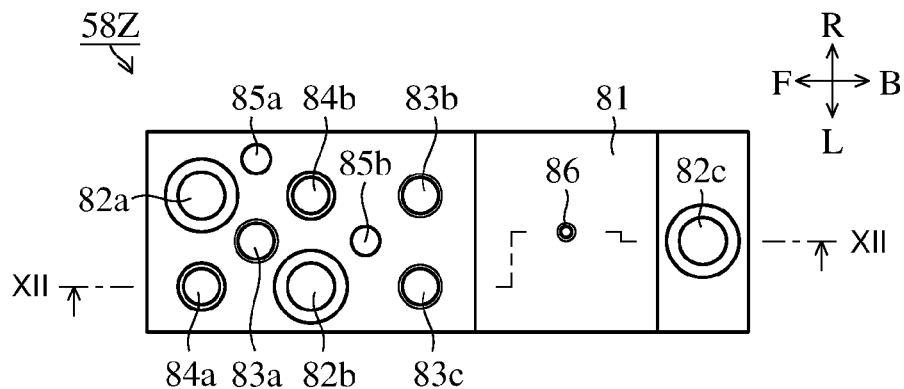
FIGS. 11 and 12 show a plan view and a XII-XII section view of a lower block 58Z respectively.
Figure 12:
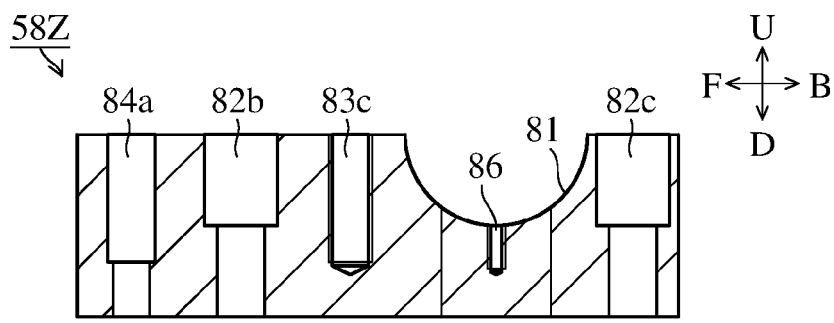
Figure 13:
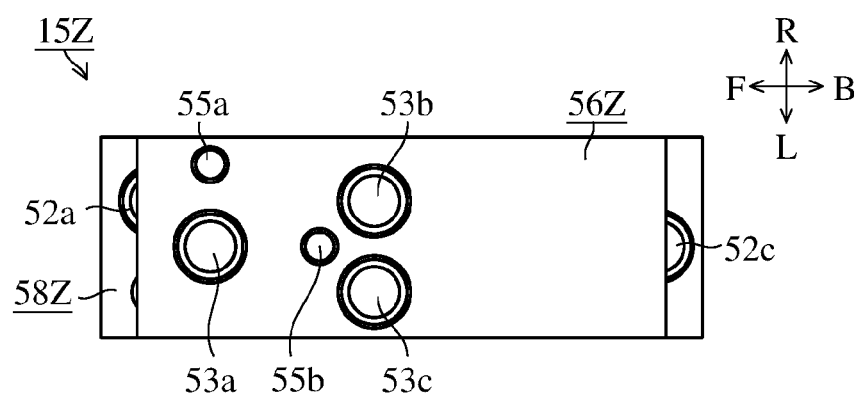
FIGS. 13 and 14 show a plan view and a sectional side view of the bearing unit 15Z respectively.
Figure 14:
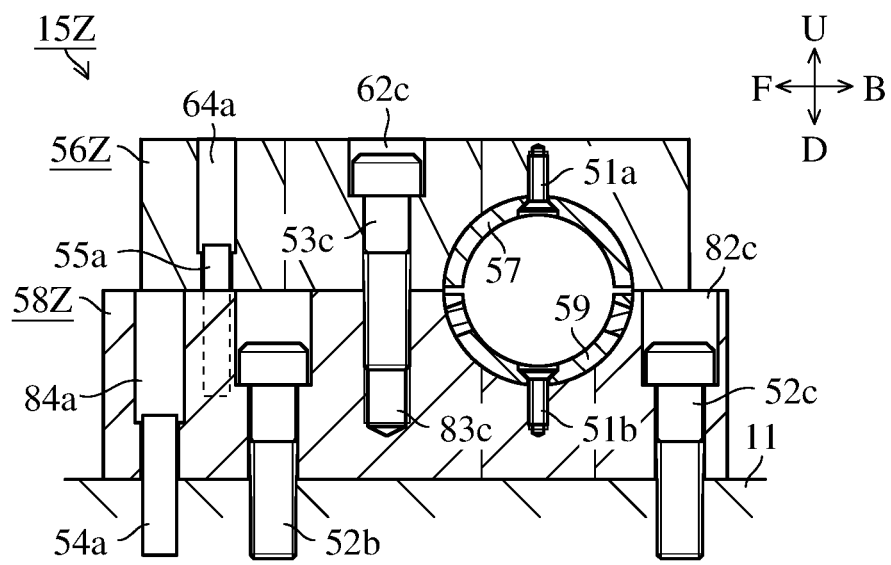
Figure 15:
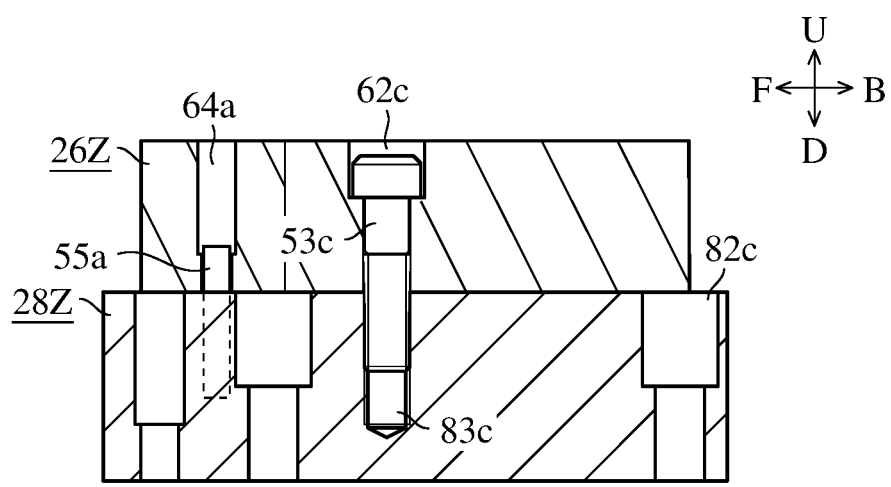
FIG. 15 shows a sectional side view of a procedure for manufacturing the bearing unit 15Z.
Figure 16:
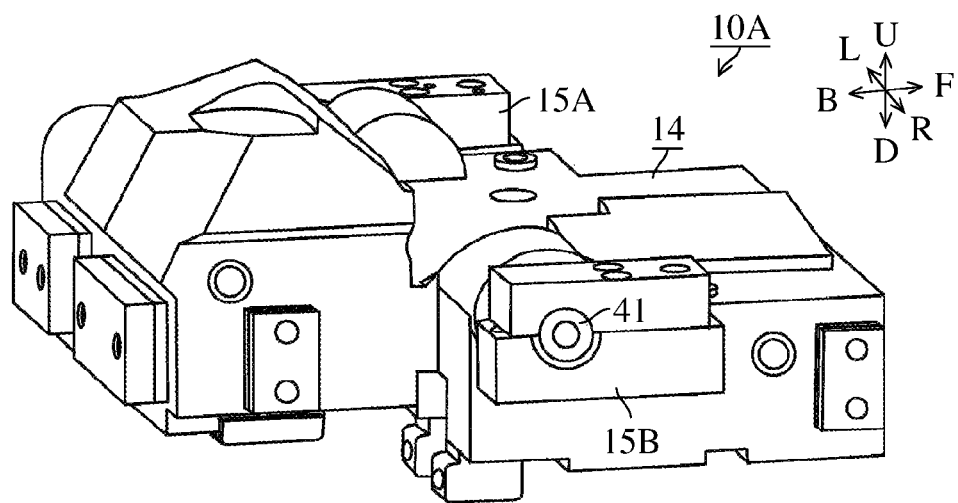
FIGS. 16 and 17 show perspective views of an apparatus 10A.

An apparatus 10A shown in FIG. 16 is a press forming apparatus. Description may be omitted for common configure to the apparatus 10Z. The apparatus 10A includes the followings.

A pivoting body 14. It has a shaft 41, and is configured to pivot around the shaft 41. A pivoting range of the pivoting body 14 is relatively narrow, normally 7 degrees or less, and not exceeding 30 degrees. A pivoting velocity of the pivoting body 14 is relatively slow, and not exceeding 20 reciprocations per minute.

Shaft supporting units 15A and 15B. They are configured to support the shaft 41 of the pivoting body 14 with capacity of pivot movement.

Figure 17:
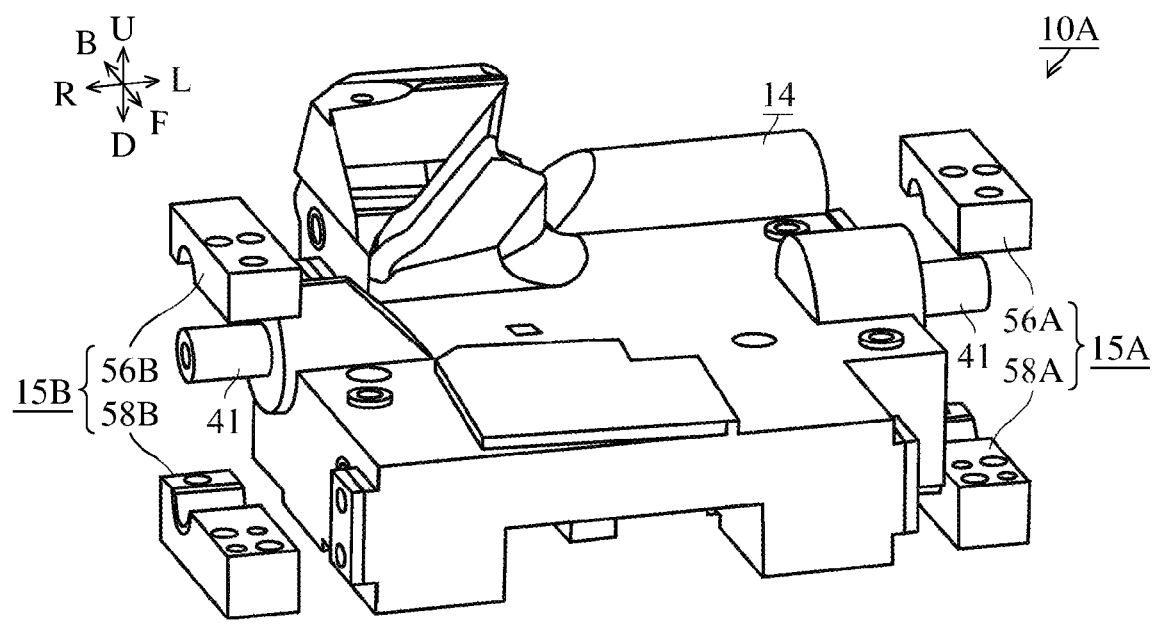

As shown in FIG. 17, the shaft supporting unit 15A has an upper block 56A and a lower block 58A. The shaft supporting unit 15B has a mirror image shape of the shaft supporting unit 15A, and has an upper block 56B and a lower block 58B.

The lower blocks 58A and 58B is fixed to a base 11, not shown, by using fixing members such as bolts. When the apparatus 10A is assembled, the shaft 41 of the pivoting body 14 is mounted on the lower blocks 58A and 58B. Then, the upper blocks 56A and 56B are mounted on the lower blocks 58A and 58B on which the shaft 41 is mounted, and fixed by using fixing members such as bolts.

Figure 18:
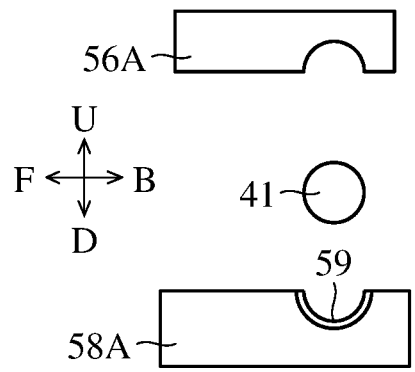
FIG. 18 show a side view of a shaft supporting unit 15A.
Figure 20:
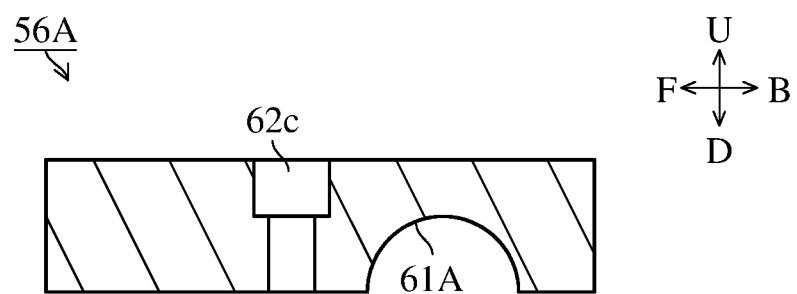

As shown in FIG. 18, a recess 61A, shown in FIG. 20, with a semicircular column shape is provided on a lower face, or a D side face, of the upper block 56A. A recess 81, shown in FIG. 20, with a semicircular column shape is provided on a upper face, or a U side face, of the lower block 58A. A lower bush 59 is fixed in it. Unlike the bearing unit 15Z, the shaft supporting unit 15A includes no upper bush. Lack of the upper bush eliminates necessity of the flat head bolt for fixing the upper bush to the upper block 56A. This reduces the number of parts, and labor to assemble. This enables to reduce manufacturing cost of the shaft supporting unit 15A. Also, there is no risk to drop the upper bush.

Figure 19:
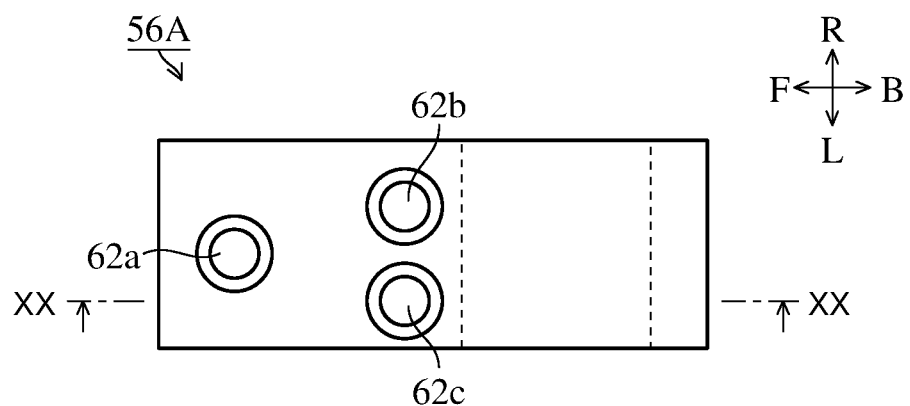
FIGS. 19 and 20 show a plan view and a XX-XX section view of an upper block 56A respectively.

As shown in FIGS. 19 and 20, the upper block 56A is made of steel, such as S45C or S50C, or the like, has a roughly rectangular parallelepiped shape with, e.g., 55 mm in width, or length along an L-R direction, 145 mm in span, or length along an F-B direction, and 35 mm in height, or length along a U-D direction, and includes bolt holes 62a to 62c. Unlike the upper block 56Z, the upper block 56A includes no positioning holes for positioning it referring to the lower block, and no female screw hole for fixing the upper bush. Absence of the positioning holes and the female screw hole reduces labor to process the upper block 56A. Also, lack of the female screw hole enables to make the height, or the length along the U-D direction, smaller than that of the upper block 56Z.

Figure 21:
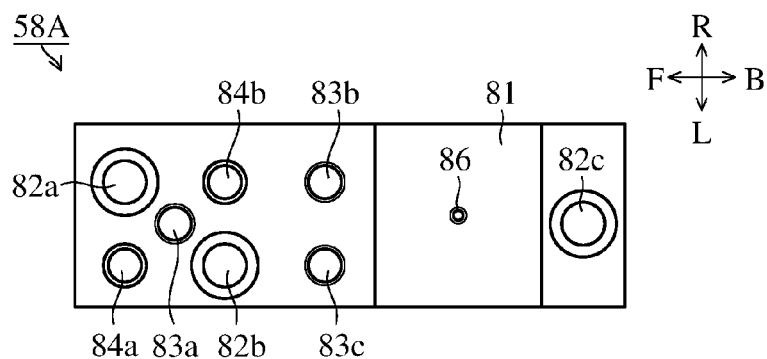
FIG. 21 shows a plan view of a lower block 58A.

As shown in FIG. 21, the lower block 58A is made of steel, such as S45C or S50C, or the like, has a roughly rectangular parallelepiped shape with, e.g., 55 mm in width, 165 mm in span, and 50 mm in height, and includes female screw holes 86 and 83a to 83c, positioning holes 84a and 84b, and bolt holes 82a to 82c. Unlike the lower block 58Z, the lower block 58A includes no positioning holes for positioning the upper block. This reduces labor to process the lower block 58A.

Figure 22:
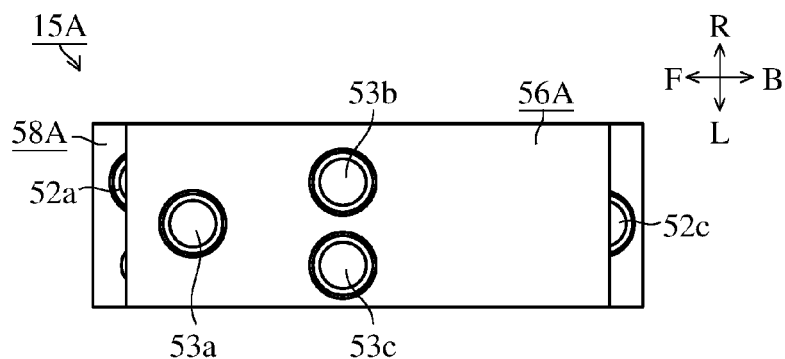
FIGS. 22 and 23 show a plan view and a sectional side view of the shaft supporting unit 15A respectively.
Figure 23:
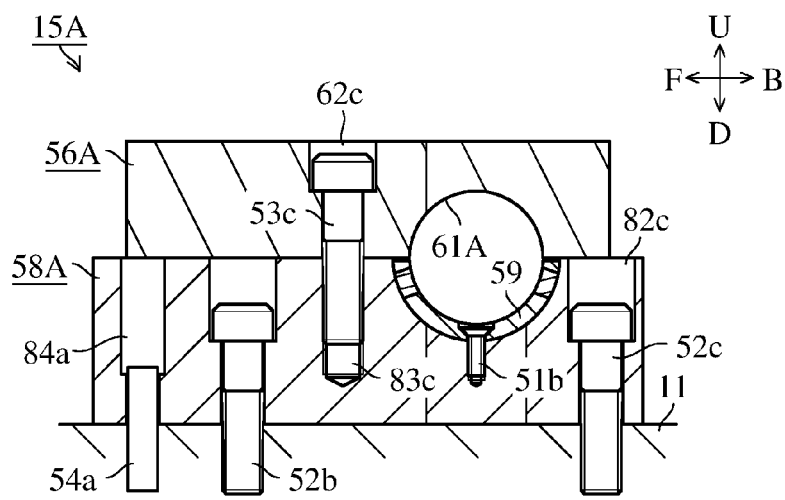

As shown in FIGS. 22 and 23, knock pins 54a and 54b, not shown, position the lower block 58A referring to the base 11, and bolts 52a to 52c fix the lower block 58A to the base 11. This enables to position the recess 81 referring to the base 11 with extreme accuracy.

In contrast, the upper block 56A is fixed to the lower block 58A by using bolts 53a to 53c, without being positioned by using knock pins. Thus, the positioning accuracy of the recess 61A is not so high.

When the pivoting body 14 pivots, the shaft 41 is supported by the lower block 58A via the lower bush 59. An inner radius of the recess 61A is slightly, e.g., 0.25 mm, greater than an outer radius of the shaft 41. This generates a predetermined gap between the recess 61A and the shaft 41. In other words, an inner face of the recess 61A does not abut the shaft 41 while the apparatus 10A is active.

In contrast, the inner face of the recess 61A may abut the shaft 41 while the apparatus 10A is inactive, e.g., the whole apparatus 10A is slanted or inverted in order to inspect or to maintain the apparatus 10A, or to retract the apparatus 10A from a manufacturing line when various products are produced.

In this case, the shaft 41 abuts the recess 61A, and thereby lift of the shaft 41 is restrained.

In this manner, the shaft 41 abuts the recess 61A only when the pivoting body 14 does not pivot. The inner face of the recess 61A functions only as a restraint face for restrain the shaft 41 from lifting. Thus, lack of the upper bush does not generate wear caused by sliding the shaft 41 and the upper block 56A.

The shaft 41 does not abut the recess 61A when the pivoting body 14 pivots. This eliminates necessity that the inner face of the recess 61A has an accurate semicircular column shape. Thus, positioning accuracy of the recess 61A may be low. No structure for improving the positioning accuracy is needed. This enables to reduce the number of parts, manufacturing steps, and assembling steps of the shaft supporting unit 15A, and thereby to restrain cost.

Also, it is satisfactory that a surface roughness of the inner face of the recess 61A is a normal finishing or so. This enables to restrain manufacturing cost of the shaft supporting unit 15A.

Unlike the bearing unit 15Z, the shaft hole portion formed by combining the recesses 61A and 81 is not required to have an accurate circular column shape. This eliminates necessity to unify the upper block 56A and the lower block 58A to form the recesses 61A and 81. Also, it removes requirement to give signs, such as matchmarks. This enables to simplify the manufacturing steps of the shaft supporting unit 15A, and to suppress cost. No management with pairing the upper block and the lower block is needed. This enables to reduce labor of management. No confirmation of signs such as matchmarks is required in assembling. This enables to shorten work hours.

Embodiment 2: Method for Manufacturing Shaft Supporting Unit

Figure 24:
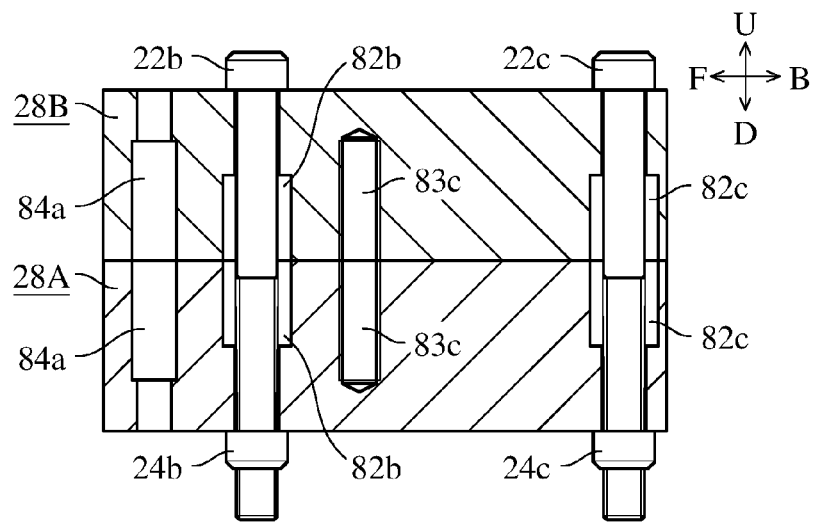
FIGS. 24 and 25 show sectional side views of procedures for manufacturing the shaft supporting units 15A and 15B.

Referring to FIG. 24, a preferable manufacturing method of the shaft supporting units 15A and 15B described in Embodiment 1 is described below.

First, two blocks 28A and 28B with rectangular parallelepiped shapes are prepared. The lower block 58A is made from the block 28A, and the lower block 58B is made from the block 28B.

Next, each of the two blocks 28A and 28B is processed to form the bolt holes 82a to 82c, the female screw holes 83a to 83c, and the positioning holes 84a to 84b.

Then, as shown in FIG. 24, the block 28B is turned upside down, and mounted on the block 28A. Since the lower block 58B has a mirror image shape of the lower block 58A, the bolt holes 82a to 82c formed to the block 28B communicate the bolt holes 82a to 82c formed to the block 28A, respectively. Bolts 22a to 22c are inserted through the communicating bolt holes 82a to 82c, and screwed with nuts 24a to 24c. Thereby, the two blocks 28A and 28B are fixed and unified to form a workpiece block.

And, the unified workpiece block is processed to form a penetrating hole with a circular column shape, so as to form the recess 81 to each of the blocks 28A and 28B.

As this manner, the recesses are formed to the two lower blocks 58A and 58B in one step. This makes it efficient to manufacture the shaft supporting units 15A and 15B.

It should be noted that the two lower blocks 58A and 58B manufactured in this manner are merely a lower block for L side and a lower block for R side. There is no need to use them for supporting the same shaft 41. Thus, no management with pairing the two lower blocks 58A and 58B is required.

Moreover, the upper block to be combined with the lower block manufactured in this manner may be manufactured by the method described in Embodiment 3, or by other methods.

Embodiment 3: Method for Manufacturing Shaft Supporting Unit

Figure 25:
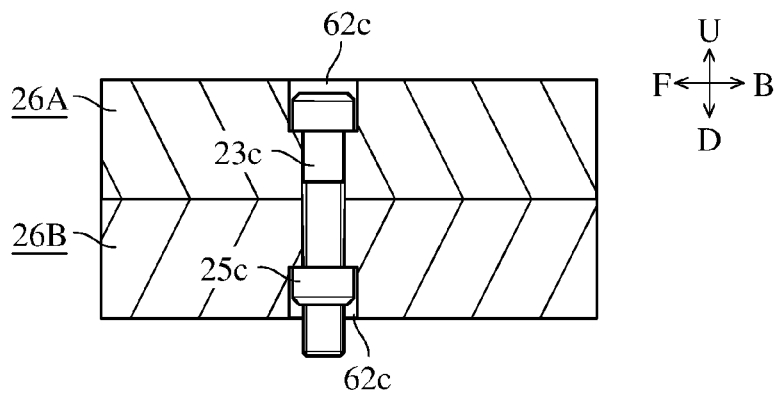

Referring to FIG. 25, a preferable manufacturing method of the shaft supporting units 15A and 15B described in Embodiment 1 is described below.

First, two blocks 26A and 26B with rectangular parallelepiped shapes are prepared. The upper block 56A is made from the block 26A, and the upper block 56B is made from the block 26B.

Next, each of the two blocks 26A and 26B is processed to form the bolt holes 62a to 62c.

Then, as shown in FIG. 25, the block 26B is turned upside down, and the block 26A is mounted on it. Since the upper block 56B has a mirror image shape of the upper block 56A, the bolt holes 62a to 62c formed to the block 26B communicate the bolt holes 62a to 62c formed to the block 26A, respectively. Bolts 23a to 23c are inserted through the communicating bolt holes 62a to 62c, and screwed with nuts 25a to 25c. Thereby, the two blocks 26A and 26B are fixed and unified to form a workpiece block.

And, the unified workpiece block is processed to form a penetrating hole with a column shape, so as to form the recess 61A to each of the blocks 26A and 26B.

As this manner, the recesses are formed to the two upper blocks 56A and 56B in one step. This makes it efficient to manufacture the shaft supporting units 15A and 15B.

It should be noted that the two upper blocks 56A and 56B manufactured in this manner are merely an upper block for L side and an upper block for R side. There is no need to use them for supporting the same shaft 41. Thus, no management with pairing the two upper blocks 56A and 56B is required.

Moreover, the lower block to be combined with the upper block manufactured in this manner may be manufactured by the method described in Embodiment 2, or by other methods.

Embodiment 4: Alternative Example of Shaft Supporting Unit

Figure 26:
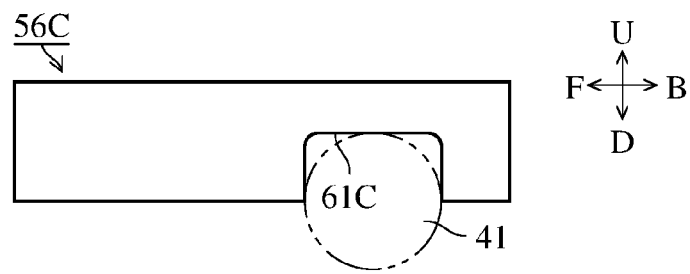
FIG. 26 shows a side view of an upper block 56C.

An upper block 56C, shown in FIG. 26, may be used as replacement of the upper block 56A in the shaft supporting unit 15A.

The upper block 56C includes a recess 61C which has a roughly quadrangular prism shape, which is different from the shape of the recess 61A of the upper block 56A. The recess 61C approaches to the shaft 41 the most closely at three places, which are at an F side, a U side and a B side of the shaft 41. When the pivoting body 14 pivots, the recess 61C does not abut on the shaft 41. There are predetermined gaps, i.e. 0.25 mm, between the recess 61C and the shaft 41.

As this manner, the shape of the upper recess is not limited to a semicircular column shape. It may be a quadrangular prism shape. Moreover, it may be a semi-elliptic column shape or other curved column shapes, or prism shape or other column shapes such as a V column shape.

In any cases, the upper recess does not abut on the shaft 41 when the pivoting body 14 pivots. Preferably, there is a 0.2 mm or larger gap between the upper recess and the shaft 41 when the pivoting body 14 pivots. If the gap is narrower than it, the upper recess is likely to contact with the shaft when the pivoting body pivots.

Preferably there may be one or more places where the gap between the upper recess and the shaft 41 when the pivoting body pivots is 0.5 mm or less, because a larger gap reduces effect to restrain lift of the shaft 41. More preferably, there may be two or more places where the gap between the upper recess and the shaft 41 is 0.5 mm or less.

It should be noted that the recess 61C may be formed by the method described in Embodiment 3, or by other methods.

The above described embodiment is an example to make understanding easier. The present invention is not limited to the example, and includes any modified, altered, added, or removed variations, without departing from the scope of the claims attached herewith. This can be easily understood by persons skilled in the art.

For example, the shaft supporting unit according to the present invention may be used in any apparatuses with pivoting bodies. They are not limited to the press forming apparatus. It may be used in an extrusion molding apparatus, an injection molding apparatus or other apparatuses for forming various materials such as metal or plastic, or other machining apparatuses, a driving transmission apparatus, or other industrial equipments, or other apparatuses.

REFERENCE SIGNS LIST 10A and 10Z: apparatus; 11: base; 12: fixed die; 13 cylinder; 31 piston; 14 pivoting body; 41: shaft; 42: transmission block; 43: forming portion; 15A to 15C: shaft supporting unit; 15Y and 15Z: bearing unit; 51a and 51b: flat head bolt; 22a to 22c, 23a to 23c, 52a to 52c and 53a to 53c: bolt; 54a, 54b, 55a and 55b: knock pin; 56A to 56Z: upper block; 61A, 61Z and 81: recess; 62a to 62c and 82a to 82c: bolt hole; 64a, 64b, 84a, 84b, 85a and 85b: positioning hole; 66, 83a to 83c and 86: female screw hole; 57: upper bush; 71 and 91: countersink; 58A to 58Z: lower block; 59: lower bush; 20: workpiece; 24a to 24c and 25a to 25c: nut; and 26A to 26Z and 28A to 28Z: block.

The invention claimed is:

1. A method for manufacturing first and second shaft supporting units, each of the first and second shaft supporting units to be used for supporting a shaft of a pivoting body with a capacity of pivot movement and comprising a lower block having a lower recess with a semicircular column shape, and configured to support the shaft from beneath, and a lower bush having a semi-cylindrical shape, located in the lower recess, and configured to have the shaft slide thereon, each of the first and second shaft supporting units not abutting an upper side of the shaft when the pivoting body pivots, the method comprising:
   making an upper face of a first block to contact with an upper face of a second block, and fixing the first block to the second block to form a workpiece block;
   forming a penetrating hole with a circular column shape to the workpiece block, so as to form the lower recess to each of the first and second blocks; and
   using the first block as the lower block of the first shaft supporting unit, and using the second block as the lower block of the second shaft supporting unit, so as to manufacture the first and second shaft supporting units.

2. The method as claimed in claim 1, wherein each of the first and second shaft supporting units further comprises an upper block covering above the shaft, the upper block having an upper recess with a predetermined gap between the upper recess and the shaft.

3. The method as claimed in claim 2, wherein
   no bush for sliding the shaft thereon is located in the upper recesses of the upper blocks.

4. The method as claimed in claim 1, wherein
   a second penetrating hole is formed to each of the first and second blocks, each of the second penetrating holes configured to insert a fixing member therethrough so as to fix the lower block when in use; and
   the first and second blocks are fixed by inserting a fixing member through the second penetrating holes.

5. A method for manufacturing first and second shaft supporting units, each of the first and second shaft supporting units to be used for supporting a shaft of a pivoting body with a capacity of pivot movement and comprising a lower block having a lower recess with a semicircular column shape, and configured to support the shaft from beneath, a lower bush having a semi-cylindrical shape, located in the lower recess, and configured to have the shaft slide thereon, and an upper block covering above the shaft, the upper block having an upper recess with a predetermined gap between the upper recess and the shaft, each of the first and second shaft supporting units not abutting an upper side of the shaft when the pivoting body pivots, the method comprising:
   making a lower face of a first block contact with a lower face of a second block, and fixing the first block to the second block to form a workpiece block;
   forming a penetrating hole with a column shape to the workpiece block, so as to form the upper recess to each of the first and second blocks; and
   using the first block as the upper block of the first shaft supporting unit, and using the second block as the upper block of the second shaft supporting unit, so as to manufacture the first and second shaft supporting units.

6. The method as claimed in claim 5, wherein
   a second penetrating hole is formed to each of the first and second blocks, each of the second penetrating holes configured to insert a fixing member therethrough so as to fix the upper block to the lower block when in use; and
   the first and second blocks are fixed by inserting a fixing member through the second penetrating holes.

* * * * *